United States Patent [19]

Eggington

[11] 3,779,334
[45] Dec. 18, 1973

[54] CELLS FOR FLUID CUSHION VEHICLES
[75] Inventor: Wilfred J. Eggington, Claremont, Calif.
[73] Assignee: Aerojet-General Corporation, El Monte, Calif.
[22] Filed: June 7, 1972
[21] Appl. No.: 260,513

Related U.S. Application Data
[63] Continuation-in-part of Ser. No. 35,834, May 8, 1970, abandoned.

[52] U.S. Cl. .............................. 180/121, 180/127
[51] Int. Cl. ............................................ B60v 1/00
[58] Field of Search .............................. 180/116–130

[56] References Cited
UNITED STATES PATENTS
3,334,701  8/1967  Chaplin .............................. 180/127
3,339,655  9/1967  Guienne ............................. 180/127
3,369,623  2/1968  Bertin ................................ 180/127
3,465,845  9/1969  Bertin ................................ 180/121
3,511,331  5/1970  Landry ............................... 180/127
3,512,603  5/1970  Crewe ................................ 180/127

Primary Examiner—Kenneth H. Betts
Assistant Examiner—Terrance L. Siemens
Attorney—Edward O. Ansell et al.

[57] ABSTRACT

The lower rear portion of the skirt of a fluid cushion cell for a fluid cushion vehicle is provided with a cutaway portion tending to maintain this rear portion raised somewhat further above the terrain than would be the case if the cutaway were not present. This reduces contact drag on the terrain or water over which the vehicle is travelling and results in less wear and tear on the skirt of the cell. It also provides a thrust component by reason of the increased escape of fluid from the cell through the cutaway region. A similar cutaway formation can be made in a peripheral skirt for the vehicle if such peripheral skirt be present.

7 Claims, 9 Drawing Figures

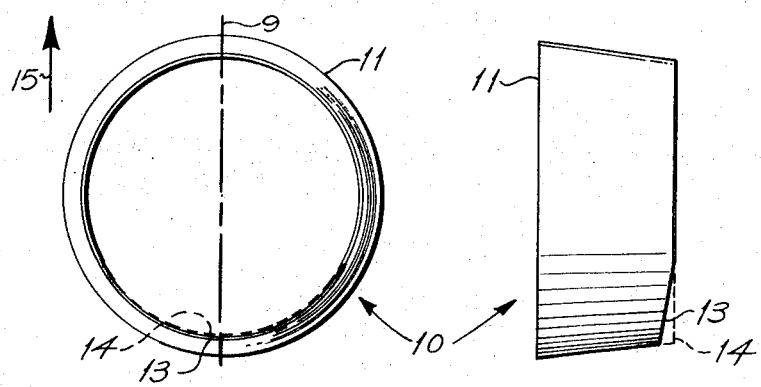
FIG. 1a    FIG. 1b
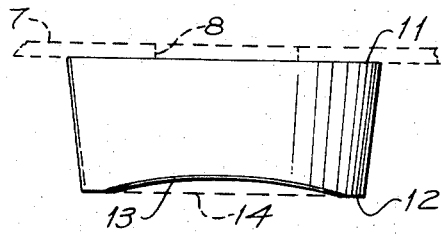  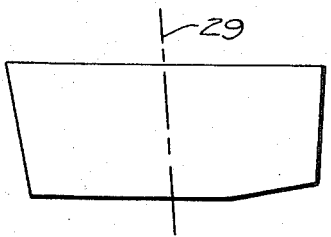
FIG. 1c    FIG. 4
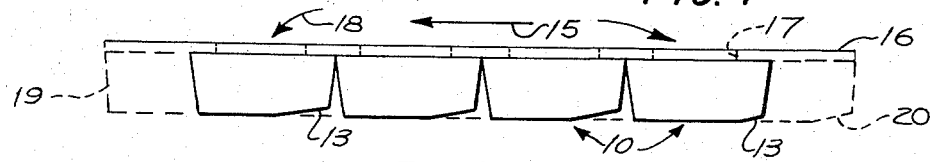
FIG. 2
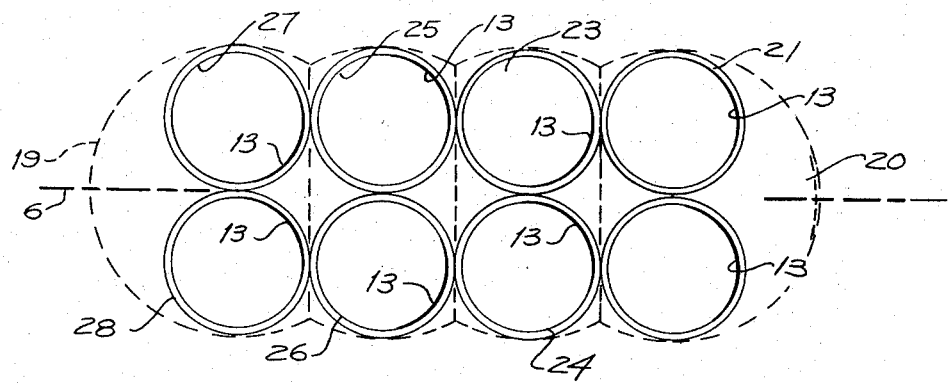
FIG. 3
INVENTOR.
WILFRED J. EGGINGTON
BY
J. Gordon Angus
ATTORNEYS

CELLS FOR FLUID CUSHION VEHICLES

This invention relates to cushion cells for fluid cushion vehicles, and is a continuation-in-part of co-pending U.S. application Ser. No. 35,834 filed May 8, 1970 now abandoned by W. J. Eggington, entitled "Cells For Fluid Cushion Vehicles."

Fluid cushion vehicles, sometimes known as "ground effect vehicles" commonly comprise a vehicle body or frame having cells formed by flexible skirts which provide a cushion of pressurized fluid, such as air, between the vehicle and the terrain over which it travels, for the purpose of providing lift for the vehicle. The pressurized fluid is ordinarily provided by a fluid compression means, usually an air compressor, which sends the pressurized fluid such as air into the cushion cells located at the bottom of the vehicle, such that pressure of the fluid from beneath the cushion cells provides sufficient lift for the vehicle to raise it above the terrain such as land or water, such that the fluid, ordinarily air, escapes from the vehicle through the space and between the bottom of the cells, and the terrain, created by the lift. Such vehicles are capable of hovering above the terrain or water and are commonly provided with suitable drive mechanisms such as jets or propellers to propel the vehicle in some direction.

Objects of the invention are to reduce contact drag over water and obstacles, particularly in rough water and at hump speed. A related object is to improve roll and pitch stability characteristics and reduce accelerations due to sea state. Other objects are to provide a propulsive thrust component from the cushion system and to reduce maintenance of skirts.

The invention is carried out by means of a cutaway of the lower portion of a rear part of the skirt toward its trailing edge. The cutaway is preferably made at a small angle to the horizontal.

It is contemplated that the cutaway configurations may be given to only the rearmost cells of the vehicle or alternatively all cells may be provided with cutaway configurations.

According to an optional feature, the cutaway may be offset from the rearmost point of the cells. The cells thus provided with cutaway configurations permit the axis of the skirt cone frustum to be tilted somewhat thereby aiding in the contact drag reduction.

When the vehicle is provided with a peripheral skirt it may also advantageously be provided with a cutaway at the rear.

This novel configuration reduces the amount of drag which would otherwise occur at the rear parts of the skirts and reduces skirt maintenance.

The foregoing and other features of the invention will be better understood from the following detailed description and the accompanying drawings of which:

FIG. 1a is a bottom view, FIG. 1b a side view, and FIG. 1c a rear end view of a cushion cell according to this invention;

FIG. 2 is a side view of a plurality of cushion cells according to this invention mounted at the bottom part of a vehicle and showing the position of an optional peripheral skirt;

FIG. 3 is a bottom view of an arrangement of cushion cells according to this invention at the bottom of a vehicle and showing the position of an optional peripheral skirt;

FIG. 4 shows the tilt of a cell according to this invention when pressurized during operation;

Figure 5:
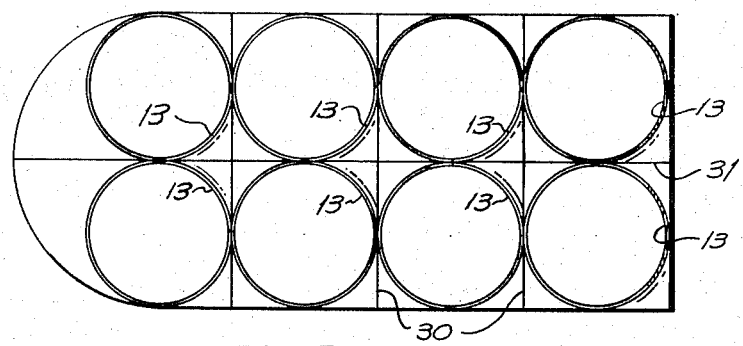
FIG. 5 shows another arrangement of cushion cells according to this invention, at the bottom of the vehicle but without the peripheral skirt.

Referring to the drawings, FIGS. 1a, 1b and 1c show a cushion cell 10 according to this invention formed by a skirt shaped as a frustum of a cone which according to common practice is made of flexible material. The cell is open at the top and bottom and when attached to a vehicle the upper circular rim 11 will ordinarily be secured to a suitable horizontal partition or chassis 7 on the vehicle, provided with an opening 8 through which fluid under pressure, ordinarily compressed air from a suitable source such as an air compressor, sends the compressed air to the opening of the partition. The lower rim 12 which is the rim of smaller diameter, will be adjacent the water or terrain over which vehicle passes.

According to the invention a part of the lower rim has formed in it a cutaway 13 which may be created by removing or omitting that part of the skirt which would extend to the dotted line 14 representing the form which the skirt would have if it were made as a symmetrical frustum of a cone and without the cutaway. The cutaway is in the form which would result if the bottom of a symmetrical cell were cut along a plane making a slight angle to the horizontal and slanted upwardly and rearwardly from the bottom. In FIGS. 1a, 1b, and 1c, this cutaway is symmetrically located along the axis of movement 9 of the cell when the vehicle is in motion in the direction shown by the arrow 15.

FIG. 2 shows a side view of an arrangement of a number of the cells 10 as they will be arranged on a vehicle and mounted on a suitable horizontal partition 16 provided with openings 17 (which may be the same as parts 7 and 8 of FIG. 1c) leading into the cushion cells and through which the fluid under pressure, such as compressed air is sent from a suitable source above the partition such as an air compressor, as shown by the arrows 18. In FIG. 2 all the cells are shown provided with cutaways 13 at their lower rear skirt portions.

It is optional whether the vehicle is provided with a peripheral skirt, such an optional peripheral skirt 19 is shown in FIG. 2 in dotted lines. This will be of flexible material of a height corresponding with the height of the frusto-conical cells and will pass all around the cells beneath the vehicle.

FIG. 2 shows all of the cushion cells provided with the cutouts 13, although it is possible to obtain the benefits of the invention by providing only the rearward cells with the cutouts. When a peripheral skirt 19 is used, pressure is developed within it and this likewise will be provided with a rearward cutout 20, positioned similarly to those of the cells.

In FIG. 2 the cells are shown with their cutouts extending over the rear semi-circle of the lower rim of the skirt. It should be understood however, that the cutout may if desired be made of a lesser extent such as for example as shown in FIG. 1a.

It is possible to offset the cutaway from the rear-most part of the cell. FIG. 3 which shows a bottom view of a cell arrangement of a vehicle like that of FIG. 2, shows several possible arrangements of cutouts. The two rear-most cells 21 and 22 are shown with their cutouts symmetrically at the rear as previously described. The next two cells 23 and 24 and also cells 27 and 28, have their cutouts offset toward the central axis 6 of the vehicle, such that they are symmetrically arranged with respect to each other and with reference to the axis. Cells 25 and 26 are similar to the arrangement of cells 23 and 24 except that the cutouts are offset away from the central axis.

The cutaways of the cells are ordinarily made so that the center of pressure within the cell is unchanged by reason of the cutaway. The effect of the cutaway of the rear portion of a cell is to cause the central axis 29 of the skirt cone frustum to become tilted from the vertical as shown in FIG. 4. This tilt results in further contact drag reduction.

Figure 6:
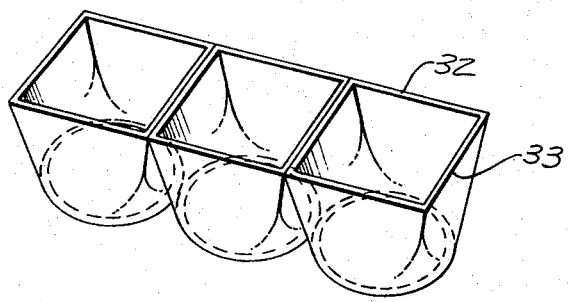
FIG. 6 is an isometric view of several cushion cells of the type shown in FIG. 5.

FIG. 5 shows the application of the invention to cells having square attachments to the vehicle as covered in Reginald B. Page application Ser. No. 816,726, filed Apr. 16, 1969, now abandoned, assigned to the same assignee as the present application. In this arrangement, the upper cell rim instead of being circular as in FIG. 3, is square, the bottom rim being circular as in FIG. 3. The square upper rims of all the cells are attached along intersecting straight lines 30 and 31. An isometric view of several square attachment cells, without cutaways, is shown in FIG. 6, wherein they are shown attached to square frames of which the sides 32 and 33 perpendicular to each other correspond with the lines 30 and 31 of FIG. 5. These square frames can be attached to the underside of a partition like the partition 16 of FIG. 2. The cutaways at the rear of the lower cell skirts can be in accordance with those shown in FIG. 3.

Figure 7:
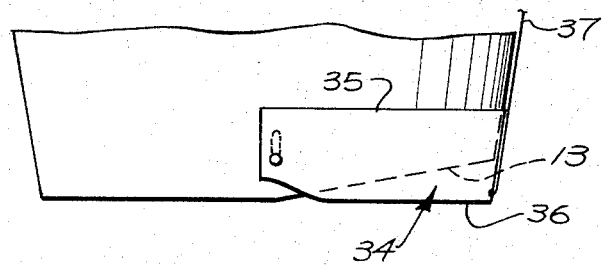
FIG. 7 shows a controllable flap arrangement according to this invention which may be used to cover up a cutaway part of a cell.

There may be circumstances when it will be desirable to eliminate the effect of the cutaways of some or all of those cells provided with cutaways. Such a circumstance could occur, for example, during a deceleration operation, where it may not be desirable to have a substantial forward thrust component. A means for doing this is shown in FIG. 7 which shows a control-lable flap 34 of flexible material fastened along a horizontal line 35 around the rear portion of the cell skirt at a distance up from the bottom thereof. The lower edge 36 of the flap is shaped to cover up the cutaway of the cell when the flap is allowed to drop down to its lowest position. A suitable cord 37 attached at or near the lower edge of the flap can be pulled up to pull the flap up to expose the cutaway when it is desired to make the cutaway effective. The controllable flap may be attached either at the inside or at the outside surface of the cell skirt. It is understood that this specie of cell, having the additional feature of a controllable flap may be substituted for some or all of the cells disclosed in the other figures with respect to any fluid cushion previously described with the same resultant operation, plus the advantage of being able to selectively attenuate the forward thrust component.

To avoid undesirable instability of a skirt provided with a cutaway according to this invention it is desired that the cutaway be made at an angle to the horizontal which is small, preferably about 10° or less to the horizontal.

By this invention there is provided a cushion cell configuration having a reduced contact drag as compared with that experienced in the use of cells not provided with cutaways. From the above description it will be apparent that the rear cell portions which would otherwise drag, are brought upward sufficient to substantially reduce the drag.

The invention is particularly applicable to vehicles used over water, although improved performance over land can be had also.

What is claimed is:

1. A fluid cushion vehicle having at its bottom a plurality of cushion cells, each said cushion cell comprising a skirt of flexible material having an upper portion for connection with a source of pressurized fluid and having a lower opening through which the fluid escapes from the cell through the clearance region between the skirt and the medium over which the cell is located, said lower opening lying in a substantially horizontal plane except for a region at a rear portion thereof which is elevated with reference to said horizontal plane so that more fluid escapes from beneath the cell through said elevated region than elsewhere at the bottom of the cell; and the centers of some of the cushion cell elevated regions being offset to one side, and others to the other side of the axis of movement of the vehicle.

2. A fluid cushion vehicle having at its bottom a plurality of cushion cells, each said cushion cell comprising a skirt of flexible material having an upper portion for connection with a source of pressurized fluid and having a lower opening through which the fluid escapes from the cell through the clearance region between the skirt and the medium over which the cell is located, said lower opening lying in a substantially horizontal plane except for a region at a rear portion thereof which is elevated with reference to said horizontal plane so that more fluid escapes from beneath the cell through said elevated region than elsewhere at the bottom of the cell, and the centers of at least some of the cushion cell elevated regions being offset from the axis of movement of the vehicle.

3. A cushion cell for a fluid cushion vehicle comprising a skirt of flexible material having an upper portion for connection with a source of pressurized fluid and having a lower opening through which the fluid escapes from the cell through the clearance region between the skirt and the medium over which the cell is located, said lower opening lying in a substantially horizontal plane except for a region at a rear portion thereof which is elevated with reference to said horizontal plane so that more fluid escapes from beneath the cell through said elevated region than elsewhere at the bottom of the cell, retractable flap means attached at the rear part of said skirt in such position that its lower edge is substantially a continuation of said lower opening of the skirt in the substantially horizontal plane, and means for retracting said flap to uncover said region at the rear portion of the lower opening which is elevated with reference to said horizontal plane.

4. A cushion cell according to claim 3 in which the attachment of the skirt to the source of pressurized fluid is in the form of a polygon.

5. A vehicle having at its bottom a plurality of cushion cells according to claim 3.

6. A vehicle according to claim 5 in which the centers of at least some of the cushion cell elevated regions are offset from the axis of movement of the vehicle.

7. A vehicle according to claim 6 in which the centers of some of the cushion cell elevated regions are offset to one side, and others to the other side of the axis of movement of the vehicle.

* * * * *